Aug. 24, 1954   J. M. JACKSON   2,687,293
OVERLOAD GAUGE FOR TRUCK AXLES
Filed March 13, 1953
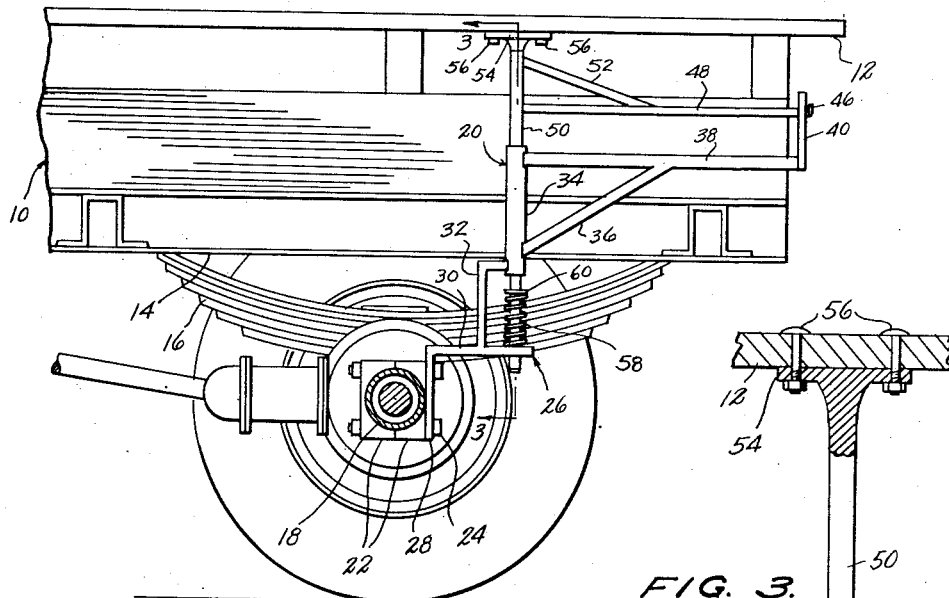
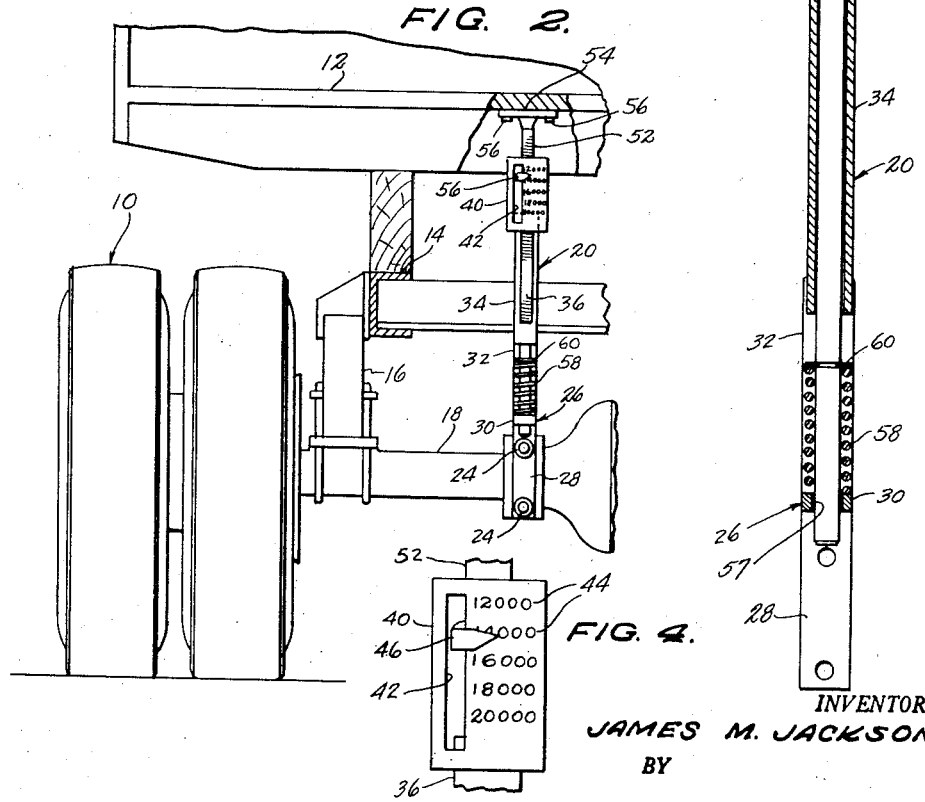
INVENTOR.
JAMES M. JACKSON,
BY
McMorrow, Berman & Davidson
ATTORNEYS Patented Aug. 24, 1954

2,687,293

UNITED STATES PATENT OFFICE 2,687,293

OVERLOAD GAUGE FOR TRUCK AXLES

James M. Jackson, Evansville, Ind.

Application March 13, 1953, Serial No. 342,208

2 Claims. (Cl. 265—40)

This invention relates to a device mountable upon a truck for providing an indication of the load imposed upon an axle thereof.

It is well known that most states have stringent regulations with respect to the amount of load that can be imposed upon a truck axle, and as a result, it is common practice to weigh the truck on suitable, conventional scales to ascertain the axle load of the truck when the same has been loaded with its cargo.

However, in many instances scales of the type stated are not readily available, and a convenient means for ascertaining the axle load with proper accuracy does not exist.

The main object of the present invention, accordingly, is to provide an overload gauge or weight indicator for trucks which can be secured more or less permanently between the truck axle and the load support bed of the truck, in a manner effective to provide an immediate reading of the number of pounds of weight imposed upon the axle.

A further object of importance is to provide a device of the type referred to that will be inexpensively formed, simple in design, adapted for mounting upon a truck without requiring modification or redesign of any part of the truck, and locatable in a position in which it will not interfere with operation, maintenance, repair, or loading of its associated vehicle.

Yet another object of importance is to provide a device of the type stated which, though mountable between the bed and axle of the vehicle, will have an indicia-marked gauge plate and an index arm traversing said plate, with the plate and arm located remotely from the main portion of the device, at a location in which a reading can be conveniently taken.

Other objects will appear from the following description, the claims appended thereto, and from the annexed drawing, in which like reference characters designate like parts throughout the several views, and wherein:

Figure 1 is a side elevational view of an overload gauge formed in accordance with the present invention, a truck on which said gauge is mounted being illustrated fragmentarily;

Figure 2 is a rear elevational view of the device, the truck being illustrated fragmentarily;

Figure 3 is an enlarged longitudinal sectional view through the device constituting the present invention, taken substantially on line 3—3 of Figure 1; and Figure 4 is an enlarged elevational view of the gauge plate and of the pointer traversing the same.

The reference numeral 10 has been applied generally to a conventional truck having a bed 12, a frame 14 supported upon a spring assembly 16, and an axle housing 18 on which said spring assembly is mounted.

The overload gauge constituting the present invention has been designated generally by the reference numeral 20, and is adapted to be fixedly secured, at its lower end, to the axle housing, by means of clamping blocks 22. The clamping blocks 22, as will be noted from Figure 1, have confronting, semi-circular recesses, said recesses receiving the axle housing 18. Clamp bolts 24 extend through registered openings formed in the respective blocks 22, for securing said blocks fixedly to the axle housing.

The bolts 24 extend through vertically spaced openings formed in a rigid support frame 26, said frame 26 including a vertically depending leg 28 in which said vertically spaced openings are formed. The leg 28, at its upper end, is integral with a horizontally extended base portion 30, and integral or otherwise made rigid with said base portion, intermediate opposite ends of the base portion, is an upwardly and vertically extending support bar 32 rigid at its upper end with a horizontal extension that is welded or otherwise fixedly secured to the lower end portion of a vertically disposed, open ended tubular member 34.

From the description which has so far been provided, it will be observed that in my device, there is provided a stationary support frame having means adapted for fixedly mounting the same upon the axle housing of a vehicle, said frame including a tubular portion the purpose of which will be presently made apparent.

An inclined brace 36 is fixedly secured, at one end, to the lower end portion of the tubular member 34, said brace extending rearwardly of the vehicle from the tubular member and being fixedly connected, at its other end, to the midlength portion of an elongated, horizontally disposed gauge plate support bar 38.

The bar 38, as will be seen from Figure 1, extends laterally from the upper end of the tubular member 34 a substantial distance, substantially to the rear end of the bed 12. The bar 38 is fixedly connected at its inner end to the upper end of the tubular member 34, and at its outer end has a rigid connection to the lower end of a vertically disposed, rectangular gauge plate 40.

It will thus be seen that the gauge plate 40 is so positioned relative to the frame 26 as to be carried by said frame, while at the same time being located where it can be readily viewed by a user, when a reading is to be taken.

The plate 40 (see Figure 4) is formed with a vertically disposed slot 42, and adjacent said slot I provide a vertical series of scale markings 44, said markings 44 ascending in value from the upper to the lower end of said series. Thus, in the illustrated embodiment of the invention, the uppermost scale marking represents a twelve thousand pound load upon the axle, the lowermost marking representing a twenty thousand pound load.

It will be understood that where the truck is of the tandem or double-axle type, a different series of scale markings would be utilized, since double-axle trucks are permitted to carry a heavier axle load.

I believe that it will be obvious, in this regard, that when a different scale is to be used, it can be marked upon a separate plate, to be superimposed upon the gauge plate 40 in any suitable manner. Alternatively, the gauge plate 40 might, in certain commercial embodiments of the invention, be detachably secured to its associated support bar 38, to permit substitution of a new gauge plate whenever necessary. These modifications, I believe, are sufficiently obvious as not to require special illustration herein.

Arranged to traverse the graduated scale of plate 40 is a horizontally disposed, relatively short pointer 46 of an elongated index arm 48. The index arm 48 has its outer end projected through the slot 42 of the plate 40, and at its inner end is fixedly secured to a vertically arranged plunger 50 sliding in the tubular member 34.

Plunger 50 is thus made rigid with the index arm 48, and it will be apparent that when the plunger is depressed within the tubular member 34, the pointer 46 will be shifted downwardly along the graduated scale of the plate 40, so as to permit an axle load reading to be taken from the gauge plate.

To strengthen the rigid connection between the index arm 48 and plunger 50, I prefer that there be utilized an inclined brace 52, rigid at its opposite ends with the plunger and index arm respectively.

At its upper end, plunger 50 is welded or otherwise made rigid with an attachment plate 54, secured by bolts 56 or the like to the underside of the truck bed 12.

Referring now to Figure 3, the base portion 30 of frame 26 has a guide opening 57 formed therein, and the plunger 50 is proportioned to a length that will permit the lower end portion of said plunger to slide freely in said opening.

It is desirable that means be incorporated in the device tending to bias the plunger upwardly within its associated tube member 34. To this end, a spring 58 is coiled about the lower end portion of the plunger, above the base portion 30, and abuts at one end against a collar or abutment 60 fixedly secured to the plunger below the tubular member. At its other end, the spring 58 engages the base portion 30, and it will be understood that the spring will be maintained under compression between the base portion and abutment, so as to normally urge the plunger in the direction of the truck bed.

The purpose of the spring is to facilitate the mounting of the device upon a vehicle, it being understood that the spring will, after the frame 26 has been fixedly secured to the axle housing, urge the attachment plate 54 into engagement with the truck bed 12, to permit the plunger to be fixedly secured to said truck bed.

It will be seen from the above that the device constituting the present invention is simply formed, and can be secured to a vehicle with a minimum of difficulty. Modification or redesign of the vehicle is unnecessary, the frame being readily clamped to the axle housing and the plunger being connected with equal facility to the truck bed. When the device has been mounted upon the vehicle, the gauge plate 40 will be conveniently disposed to permit a load reading to be readily taken by a user, without requirement of said user's crawling under the vehicle. This is of importance when, as is often the case, the vehicle is part of a large fleet of trucks, with readings being taken constantly during the loading of the same. The arrangement is also of importance in that it facilitates checking of axle loads by enforcement officers in the various States.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. An overload gauge for vehicles comprising an upstanding support frame including a vertically disposed leg, a horizontally disposed base portion projecting from the upper end of said leg, said leg being adapted to be secured to the axle housing of a vehicle, a vertically disposed support bar having its lower end carried by said base portion intermediate the end of the latter portion, a vertically disposed open ended tubular member spaced from and on one side of said support bar and having the portion adjacent its lower end secured to the upper end of said support bar, and an upstanding gauge plate having scale markings thereon arranged on one side of and spaced from said tubular member and secured to the latter member adjacent its upper end, an upstanding plunger sliding in said tubular member and having the upper end adapted for fixed connection to the bed of said vehicle, and an index arm rigid with said plunger and arranged to traverse said scale to provide an indication of the axle load of the vehicle.

2. An overload gauge for vehicles comprising an upstanding support frame including a vertically disposed leg, a horizontally disposed base portion projecting from the upper end of said leg, said leg being adapted to be secured to the axle housing of a vehicle, a vertically disposed support bar having its lower end carried by said base portion intermediate the end of the latter portion, a vertically disposed open ended tubular member spaced from and on one side of said support bar and having the portion adjacent its lower end secured to the upper end of said support bar, and an upstanding gauge plate having scale markings thereon arranged on one side of and spaced from said tubular member and secured to the latter member adjacent its upper end, an upstanding plunger sliding in said tubular member and having the upper end adapted for fixed connection to the bed of said vehicle, an index arm rigid with said plunger and arranged to traverse said scale to provide an indication of the axle load of the vehicle, and spring means operatively connected to said plunger adjacent the lower end and said base portion for biasing the plunger upwardly within said tubular member in the direction of the bed of said vehicle.

References Cited in the file of this patent

UNITED STATES PATENTS

| Number | Name | Date |
|---|---|---|
| 1,590,544 | Petersen | June 29, 1926 |
| 1,809,373 | Bonnette | June 9, 1931 |

FOREIGN PATENTS

| Number | Country | Date |
|---|---|---|
| 182,377 | Great Britain | July 6, 1922 |
| 374,453 | Italy | Aug. 25, 1939 |